US008412829B2

(12) United States Patent
Keller et al.

(10) Patent No.: US 8,412,829 B2
(45) Date of Patent: Apr. 2, 2013

(54) SYSTEM AND METHOD FOR CONTROLLING AND MANAGING SESSIONS BETWEEN ENDPOINTS IN A COMMUNICATIONS SYSTEM

(75) Inventors: Matthew Keller, Algonquin, IL (US); Ross J. Lillie, Hoffman Estates, IL (US); James E. Mathis, Barrington, IL (US); Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 595 days.

(21) Appl. No.: 12/046,251

(22) Filed: Mar. 11, 2008

(65) Prior Publication Data

US 2008/0168172 A1 Jul. 10, 2008

Related U.S. Application Data

(62) Division of application No. 10/334,577, filed on Dec. 31, 2002, now Pat. No. 7,366,780.

(51) Int. Cl.
*G06F 15/16* (2006.01)
(52) U.S. Cl. .................................. 709/227; 709/223
(58) Field of Classification Search .......... 709/203–207, 709/217–219, 223, 227–229
See application file for complete search history.

(56) References Cited

U.S. PATENT DOCUMENTS

| 5,434,852 | A | 7/1995 | LaPorta |
| 5,517,494 | A | 5/1996 | Green |
| 5,774,673 | A | 6/1998 | Beuk et al. |
| 5,835,723 | A | 11/1998 | Andrews et al. |
| 5,928,331 | A | 7/1999 | Bushmitch |
| 6,005,848 | A | 12/1999 | Grube et al. |
| 6,026,296 | A | 2/2000 | Sanders |
| 6,108,705 | A | 8/2000 | Svennevik |
| 6,275,852 | B1 | 8/2001 | Filepp et al. |
| 6,301,245 | B1 * | 10/2001 | Luzeski et al. ............... 370/352 |
| 6,304,558 | B1 | 10/2001 | Mysore |

(Continued)

FOREIGN PATENT DOCUMENTS

| EP | 1282322 B1 | 7/2002 |
| EP | 1248431 A1 | 9/2002 |

(Continued)

OTHER PUBLICATIONS

English language Abstract of JP Patent Publication No. JP2001-352341, European Patent Office, espacenet database—Worldwide (2003).

(Continued)

*Primary Examiner* — Minh-Chau Nguyen
(74) *Attorney, Agent, or Firm* — Valerie M. Davis; Steven A. May

(57) ABSTRACT

In a communications system having at least one service entity and a plurality of endpoints each including a logical entity and a terminal, a method facilitates a session between at least two of the endpoints in the system. The method includes: receiving a first message having information that includes a request for a session between a first endpoint that includes a non-dispatch terminal and at least one other endpoint; detecting that the first endpoint includes a non-dispatch terminal as a function of the first endpoint being unable to perform at least one function; and causing the at least one function to be performed on behalf of the first endpoint by the at least one service entity to facilitate the session between the first endpoint and the at least one other endpoint.

13 Claims, 5 Drawing Sheets

800

U.S. PATENT DOCUMENTS

| | | |
|---|---|---|
| 6,349,097 B1 | 2/2002 | Smith |
| 6,385,198 B1 | 5/2002 | Ofek et al. |
| 6,438,114 B1 | 8/2002 | Womack |
| 6,449,260 B1 | 9/2002 | Sassin |
| 6,477,150 B1 | 11/2002 | Maggenti et al. |
| 6,483,832 B1 | 11/2002 | Civanlar et al. |
| 6,505,253 B1 * | 1/2003 | Chiu et al. .................. 709/235 |
| 6,507,562 B1 * | 1/2003 | Kadansky et al. ............ 370/216 |
| 6,529,882 B1 | 3/2003 | Park et al. |
| 6,567,851 B1 | 5/2003 | Kobayashi |
| 6,587,684 B1 | 7/2003 | Hsu et al. |
| 6,611,872 B1 | 8/2003 | McCanne |
| 6,728,748 B1 | 4/2004 | Mangipudi et al. |
| 6,798,755 B2 * | 9/2004 | Lillie et al. .................. 370/312 |
| 6,798,780 B1 * | 9/2004 | Dan et al. .................. 370/395.21 |
| 6,823,364 B1 | 11/2004 | Sollee et al. |
| 6,845,389 B1 | 1/2005 | Sen et al. |
| 6,898,423 B2 | 5/2005 | Motegi et al. |
| 6,934,279 B1 | 8/2005 | Sollee et al. |
| 6,965,614 B1 | 11/2005 | Osterhout et al. |
| 6,985,961 B1 | 1/2006 | Ramsayer et al. |
| 7,023,813 B2 * | 4/2006 | Newberg et al. .............. 370/312 |
| 7,031,700 B1 | 4/2006 | Weaver et al. |
| 7,079,495 B1 | 7/2006 | Pearce et al. |
| 7,170,863 B1 | 1/2007 | Denman et al. |
| 7,343,254 B2 | 3/2008 | Otusuka et al. |
| 7,366,780 B2 * | 4/2008 | Keller et al. .................. 709/227 |
| 7,502,837 B2 * | 3/2009 | Westman et al. ............. 709/219 |
| 7,783,310 B2 * | 8/2010 | Rana et al. .................. 455/466 |
| 7,936,680 B2 * | 5/2011 | Osswald .................. 370/236 |
| 7,970,426 B2 * | 6/2011 | Poe et al. .................. 455/519 |
| 8,078,730 B2 * | 12/2011 | Travostino .................. 709/227 |
| 2002/0035602 A1 * | 3/2002 | Garcia-Luna-Aceves et al. .................. 709/204 |
| 2002/0037735 A1 | 3/2002 | Maggenti |
| 2002/0061760 A1 | 5/2002 | Maggenti |
| 2002/0061761 A1 | 5/2002 | Maggenti |
| 2002/0061762 A1 | 5/2002 | Maggenti |
| 2002/0073208 A1 | 6/2002 | Wilcock |
| 2002/0077136 A1 | 6/2002 | Maggenti |
| 2002/0086665 A1 | 7/2002 | Maggenti |
| 2002/0998840 | 7/2002 | Hanson |
| 2002/0119821 A1 | 8/2002 | Sen |
| 2002/0141383 A1 | 10/2002 | Schaefer et al. |
| 2002/0150091 A1 | 10/2002 | Lopponen et al. |
| 2002/0150092 A1 | 10/2002 | Bontempi |
| 2002/0156903 A1 | 10/2002 | Bach Corneliussen |
| 2002/0177466 A1 | 11/2002 | Laurila |
| 2002/0184373 A1 | 12/2002 | Maes |
| 2003/0079037 A1 | 4/2003 | Donnelly et al. |
| 2003/0095510 A1 | 5/2003 | Dorenbsoch |
| 2003/0115283 A1 | 6/2003 | Barbir et al. |
| 2003/0152040 A1 | 8/2003 | Crockett et al. |
| 2003/0227899 A1 | 12/2003 | McCann |
| 2003/0235184 A1 | 12/2003 | Dorenbosch et al. |
| 2004/0057405 A1 | 3/2004 | Black |
| 2004/0125760 A1 | 7/2004 | Newberg et al. |
| 2004/0125802 A1 | 7/2004 | Lillie et al. |
| 2004/0131042 A1 | 7/2004 | Lillie et al. |
| 2004/0131060 A1 | 7/2004 | Newberg et al. |
| 2004/0133683 A1 * | 7/2004 | Keller et al. .................. 709/227 |
| 2004/0139088 A1 | 7/2004 | Mandato |
| 2005/0105511 A1 | 5/2005 | Poikselka |
| 2005/0124365 A1 | 6/2005 | Balasuriya et al. |
| 2005/0143135 A1 | 6/2005 | Brems et al. |
| 2005/0169223 A1 | 8/2005 | Crocker |
| 2006/0045043 A1 | 3/2006 | Crocker |
| 2006/0047820 A1 | 3/2006 | Sung et al. |
| 2006/0058052 A1 | 3/2006 | Plestid et al. |
| 2006/0116149 A1 | 6/2006 | Dunn et al. |
| 2006/0121924 A1 | 6/2006 | Rengaraju et al. |
| 2006/0153102 A1 | 7/2006 | Kuure et al. |
| 2006/0229094 A1 | 10/2006 | Huh et al. |
| 2007/0105578 A1 | 5/2007 | Shaffer |
| 2008/0120364 A1 * | 5/2008 | Chari et al. .................. 709/203 |
| 2010/0284720 A1 | 11/2010 | Hayashi |

FOREIGN PATENT DOCUMENTS

| | | |
|---|---|---|
| GB | 2366477 | 8/2000 |
| JP | 05-308634 A | 11/1993 |
| JP | 10-285281 A | 10/1998 |
| JP | 2001346267 A | 12/2001 |
| WO | WO0167674 A2 | 9/2001 |
| WO | WO0167675 A2 | 9/2001 |
| WO | WO0167787 A2 | 9/2001 |
| WO | 02093953 A1 | 11/2002 |
| WO | 2004062173 A3 | 3/2005 |

OTHER PUBLICATIONS

English language Abstract of JP Patent Publication No. JP2001320536A, European Patent Office, espacenet database—Worldwide (2003).

English language Abstract of JP Patent Publication No. JP2005-227303, European Patent Office, espacenet database—Worldwide (2003).

English language Abstract of JP Patent Publication No. JP2001-145136, European Patent Office, espacenet database—Worldwide (2003).

English language Abstract of JP Patent Publication No. JP2001-339592, European Patent Office, espacenet database—Worldwide (2003).

English language Abstract of JP Patent Publication No. JP10-154980, European Patent Office, espacenet database—Worldwide (2003).

English language Abstract of JP Patent Publication No. JP61-135269, European Patent Office, espacenet database—Worldwide (2003).

English language Abstract of JP Patent Publication No. JP63-211940, European Patent Office, espacenet database—Worldwide (2003).

English language Abstract of JP Patent Publication No. JP2008-292923, European Patent Office, espacenet database—Worldwide (2003).

English language Abstract of JP Patent Publication No. JP2009-284210, European Patent Office, espacenet database—Worldwide (2003).

English language translation of Notice of Allowance for counterpart Japanese Patent Application No. 2004-565604 dated Sep. 8, 2009.

Final Office Action mailed on Jul. 9, 2010 in related U.S. Appl. No. 11/196,942, Donald G Newberg, Aug. 4, 2005.

European Search Report for European Patent Application No. 03 814 886.2, mailed on May 25, 2012.

Rosenberg J., "Models for Multi Party Conferencing in SIP " Dynamic Soft, Internet Engineering Task Force Internet Draft, Feb. 2002, 26 pages.

Office Action for related European Patent Application No. 03 799 997.6 dated Sep. 30, 2010.

Roach A. B., "Session Initiation Protocol (SIP)—Specific Event Notification," RFC3265, IETF Standard, Internet Engineering Task Force, IETF, Jun. 2002.

Supplementary European Search Report for related European Application No. 03 799 997.6, European Patent Office, The Hague, Netherlands, mailed on Jun. 9, 2010.

Office Action for related Japanese Patent Application No. JP 2004-565567 dated Jul. 20, 2010.

Office Action for related Japanese Patent Application No. JP 2004-565567 dated Sep. 9, 2008.

Office Action for related Japanese Patent Application No. JP 2004-565567 dated Aug. 21, 2007.

Office Action for related Japanese Patent Application No. JP 2004-565567 dated Sep. 8, 2009.

International Search Report for related International Application No. PCT/US03/40664 mailed on Dec. 9, 2004.

Notice of Allowance mailed on Jan. 10, 2011 in related U.S. Appl. No. 10/334,521, Ross J Lillie, Dec. 31, 2002.

Office Action for related Canadian Patent Application No. 2510631 dated May 17, 2010.

Office Action for Israel related Application No. 169106 dated Sep. 6, 2009.

Notice of Allowance mailed on Sep. 20, 2010 in related U.S. Appl. No. 10/334,521, Ross J Lillie, Dec. 31, 2002.
Final Office Action mailed on May 14, 2007 in related U.S. Appl. No. 10/334,521, Ross J Lillie, Dec. 31, 2002.
Non Final Office Action mailed on Dec. 28, 2006 in related U.S. Appl. No. 10/334,521, Ross J Lillie, Dec. 31, 2002.
Office Action for related Canadian Patent Application No. 2510631 dated Dec. 19, 2008.
Notice of Allowance for related Canadian Patent Application No. 2510631 dated Jul. 29, 2011.
Notice of Allowance mailed on Dec. 12, 2007 in U.S. Appl. No. 10/334,577, Matthew Keller, Dec. 31, 2002.
Final Office Action mailed on Jul. 31, 2007 in U.S. Appl. No. 10/334,577, Matthew Keller, Dec. 31, 2002.
Non Final Office Action mailed on Jan. 26, 2007 in U.S. Appl. No. 10/334,577, Matthew Keller, Dec. 31, 2002.
Notice of Allowance for counterpart Canadian Patent Application No. 2511937 dated May 26, 2009.
Office Action for counterpart Canadian Patent Application No. 2511937 dated Oct. 14, 2008.
English Language Translation of Office Action for counterpart Israel Application No. 169234 dated Aug. 3, 2009.
Office Action for counterpart Japanese Patent Application No. 2004-565604 dated Jan. 9, 2008.
Office Action for counterpart Japanese Patent Application No. 2004-565604 dated Feb. 3, 2009.
International Search Report for counterpart International Application No. PCT/US03/40696 mailed on Oct. 13, 2004.
Rosenberg, J., "SIP :Session Initiation Protocol," RFC 326, Jun. 2002.
Notice of Allowance for related Canadian Application No. 2510629 dated Jan. 14, 2008.
Office Action for related Canadian Patent Application No. 2510629 dated Dec. 18, 2006.
Office Action for related European Patent Application No. 03 814 887.0 dated Feb. 18, 2010.
Notice of Allowance for related European Application No. 03 814 887.0 dated Apr. 4, 2011.
Supplementary European Search Report for related European Application No. 03 814 887.0, European Patent Office, The Hague, Netherlands, mailed on Nov. 9, 2009.
Cohen R., et al., "Video on Demand Session Management," IEEE Journal on Selected Areas in Communications, IEEE Service Center, US, vol. 14, No. 6, Aug. 1, 1996.
English Language Translation of Office Action for related Japanese Patent Application No. 2004-565605 dated Feb. 3, 2009.
Office Action for related Japanese Patent Application No. 2004-565605 dated Jan. 9, 2008.
English language translation of Notice of Allowance for related Japanese Patent Application No. 2004-565605 dated Sep. 3, 2009.
International Search Report for related International Application No. PCT/US03/40697 mailed on Apr. 21, 2004.
Notice of Allowance mailed on Aug. 26, 2005 in related U.S. Appl. No. 10/334,635, Donald G Newberg, Dec. 31, 2002.
Non Final Office Action mailed on Jan. 25, 2005 in related U.S. Appl. No. 10/334,635, Donald G Newberg, Dec. 31, 2002.
International Search Report for related International Application No. PCT/US03/40694 mailed on Nov. 8, 2004.
Hayden, P., "LAN Addressing for Digital Video Data," Digital Equipment Corporation, Digital Technical Journal, Spring 1993, vol. 5, No. 2, pp. 77-83.

Notice of Allowance mailed on Dec. 31, 2007 in related U.S. Appl. No. 10/334,439, Donald G Newberg, Dec. 31, 2002.
Non Final Office Action mailed on May 2, 2007 in related U.S. Appl. No. 10/334,439, Donald G Newberg, Dec. 31, 2002.
Final Office Action mailed on May 17, 2006 in related U.S. Appl. No. 10/334,439, Donald G Newberg, Dec. 31, 2002.
Non Final Office Action mailed on Oct. 26, 2005 in related U.S. Appl. No. 10/334,439, Donald G Newberg, Dec. 31, 2002.
Final Office Action mailed on Jun. 23, 2005 in related U.S. Appl. No. 10/334,439, Donald G Newberg, Dec. 31, 2002.
Non Final Office Action mailed on Dec. 14, 2004 in U.S. Appl. No. 10/334,439, Donald G Newberg, Dec. 31, 2002.
Notice of Allowance for related Canadian Patent Application No. 2510622 dated Mar. 16, 2009.
Office Action for related Canadian Patent Application No. 2510622 dated Apr. 28, 2008.
Office Action for related European Patent Application No. 03 814 888.8 dated Oct. 25, 2007.
Supplementary European Search Report for European Patent Application No. 03 814 888.8, European Patent Office, The Hague, Netherlands, mailed on Jun. 29, 2006.
Rosenberg J., "Models for Multi Party Conferencing in SIP " Dynamic Soft, Internet Engineering Task Force Internet Draft, Nov. 17, 2000, 21 pages.
Rosenberg et al: "An Application Server Component Architecture for SIP," Internet Engineering Task Force Internet Draft, Mar. 2, 2001, 38 pages.
Office Action for related Japanese Patent Application No. 2004-565606 dated Feb. 6, 2007.
Office Action for related Japanese Patent Application No. 2004-565606 dated Feb. 16, 2010.
Office Action for related Japanese Patent Application No. 2004-565606 dated Sep. 9, 2008.
International Search Report for related International Application No. PCT/US03/40698 mailed on Apr. 20, 2004.
Final Office Action mailed on Jun. 6, 2011 in related U.S. Appl. No. 11/196,942, Donald G Newberg, Aug. 4, 2005.
Non Final Office Action mailed on Jan. 7, 2011 in related U.S. Appl. No. 11/196,942, Donald G Newberg, Aug. 4, 2005.
English Language Translation of German Office Action for related Application No. 11 2006 001 922.8 Feb. 19, 2010.
Non Final Office Action mailed on Jan. 6, 2010 in U.S. Appl. No. 11/196,942, Donald G Newberg, Aug. 4, 2005.
Koskelainen, P., et al., "Requirements for Floor Control Protocol draft-ietf-xcon-floor-control-req-03.txt," Transport Area, Jan. 2, 2005.
Handley, M., et al., "SDP: Session Description Protocol," ISI/LBNL, Network Working Group, Apr. 1998.
English language translation of Office Action for related Korean Patent Application No. 10-2008-7001604 mailed on Mar. 23, 2009.
International Search Report and Written Opinion for related International Application No. PCT/US2006/021462 mailed on Dec. 26, 2006.
International Preliminary Report on Patentability for related International Application No. PCT/US2006/021462 mailed on Jan. 31, 2008.
English language Abstract of Japanese Patent Publication No. JP11065976, Japanese Patent Office, Patent & Utility Model Gazette, Patent Abstracts of Japan, (2001).

* cited by examiner

SYSTEM AND METHOD FOR CONTROLLING AND MANAGING SESSIONS BETWEEN ENDPOINTS IN A COMMUNICATIONS SYSTEM

REFERENCE TO RELATED APPLICATIONS

This application is a divisional of prior application Ser. No. 10/334,577, filed Dec. 31, 2002.

The present application is related to the following U.S. applications commonly owned together with this application by Motorola, Inc.:

Ser. No. 10/334,635, filed Dec. 31, 2002, 2002, now U.S. Pat. No. 7,023,813, titled "Methods for Managing a Pool of Multicast Addresses and Allocating Addresses in a Communications System" by Newberg, et al.;

Ser. No. 10/334,523, filed Dec. 31, 2002, now U.S. Pat. No. 6,798,755, titled "Apparatus and Method for Controlling and Managing Individual Directed Sessions in a Communications System" by Lillie, et al.;

Ser. No. 10/334,439, filed Dec. 31, 2002, titled "Methods for Affiliating Endpoints with a Group and Determining Common Communication Capabilities for the Affiliated Endpoints" by Newberg, et al.;

Ser. No. 10/334,521, filed Dec. 31, 2002, titled "Method and System for Group Communication" by Lillie, et al.

TECHNICAL FIELD

The present invention relates generally to apparatus and methods for enabling a group directed session between at least two endpoints in a communications system.

BACKGROUND

Multimedia and group communications have become an important aspect of telecommunications, and the demand for such continues to increase. For instance, the Final Report of the Public Safety Wireless Advisory Committee to the Federal Communications Committee ("FCC"), dated 1996, expressed the critical need for communication resources for multimedia. Subsequently in 1998, the FCC established a band plan for the 764 MHz frequencies that included spectrum set aside for public safety wideband. In addition, the Internet Engineering Task Force ("IETF") has developed a suite of protocols that are designed for use in multimedia communications. These protocols include a Session Initiation Protocol ("SIP"), a Session Announcement Protocol ("SAP"), and a Session Description Protocol ("SDP").

Since its approval in early 1999 as an official standard, SIP has gained tremendous market acceptance for signaling communications services on the Internet. As such, numerous products incorporate the SIP standard, including but not limited to SIP desktop telephones, SIP telephony servers, and personal computing ("PC") devices running SIP applications. SIP is a text-based signaling transactional protocol, similar to Hypertext Transfer Protocol ("HTTP") and Simple Mail Transfer Protocol ("SMTP"), and works in the Application layer of the Open Systems Interconnection ("OSI") communications model. A SIP message is used to control interactive communications sessions, such as voice, video, and chat, between users (also referred to herein as callers) in a communications network. Each user is typically associated with a communications device (also referred to herein as a terminal device) that is connected to the network.

SIP was designed for controlling media sessions and for establishing media sessions between an initiating endpoint and one recipient endpoint or a small group of recipient endpoints. However, SIP is not readily scalable for establishing media sessions between an initiating endpoint and a large group of recipient endpoints. This is because in standard SIP, three messages (INVITE/OK/ACK) must be exchanged between the initiating endpoint and each recipient endpoint in a given group. If a group is particularly large, this excessive messaging could cause bandwidth and timing problems, which is not desirable for communications that are time sensitive, e.g., as in the area of public safety.

Known systems for group communication have attempted to use standard SIP for enabling group communications. To do this, these systems have implemented a call control architecture in accordance with a server-centric architecture 100 illustrated in FIG. 1. Architecture 100 may be included in a push-to-talk (PTT) communications system. Architecture 100 includes a service specific server 102 that may be, for instance a PTT server, communicatively coupled in the signaling path of an endpoint 104 and a group 110 comprising endpoints 112, 114, and 116.

Using this paradigm, group communication is supported by PTT server 102, which is known to endpoints 104, 112, 114, and 116 as the target for all call control signaling. To setup a session, an initiating endpoint must target a session request to the PTT server 102 by using its Internet Protocol (IP) address. Specifically, while the call control signaling utilized by in the session request may identify the group in some manner, routing to the PTT server 102 is accomplished by performing a domain name system (DNS) lookup and using network layer IP protocols. This approach is limited in that it ties group communication to specific servers, thereby, limiting a system's ability to perform load balancing and failure recovery and placing an additional burden on an initiating endpoint by requiring it to know not only the group name but the IP address of the correct server.

In addition, existing group communications approaches have limited scalability and performance because a distinct SIP call leg must be used to join each group member to a session. Thus, as the number of group members increases, more and more three-way signaling exchanges must be performed over shared wire-line and wireless links before session setup can be completed. For large groups, the serialization delays can increase call setup times beyond what is acceptable for certain systems, especially public safety dispatch systems.

One example of a system that uses SIP signaling in the above described limiting fashion for group communications is the system disclosed in WO0167674 A2 (Ser. No. 09/518, 776), entitled METHOD AND APPARATUS FOR PARTICIPATING IN GROUP COMMUNICATION SERVICES IN AN EXISTING COMMUNICATION SYSTEM. The specification describes a PTT server that can be added to a packet data system to provide Voice Over IP (VoIP) group communication. When a terminal desires to communicate with a net (a group of endpoints), the terminal determines the IP address of the appropriate top level server using DNS to resolve the SIP server addresses into Internet network addresses, and sends a SIP INVITE to this server requesting a session with the net. This server is further the target of call control signaling, talker arbitration signaling, and media. In addition, only point-to-point SIP signaling is used.

Thus, there exists a need for a call control architecture that takes advantage of the application layer routing control of SIP to enable a user to initiate a session based only the name and domain of the target regardless of which particular terminals they happen to be using, but that further includes features to enable greater scalability and faster call set-up for large groups of users.

BRIEF DESCRIPTION OF THE FIGURES

A preferred embodiment of the invention is now described, by way of example only, with reference to the accompanying figures in which.

DETAILED DESCRIPTION

Figure 1:
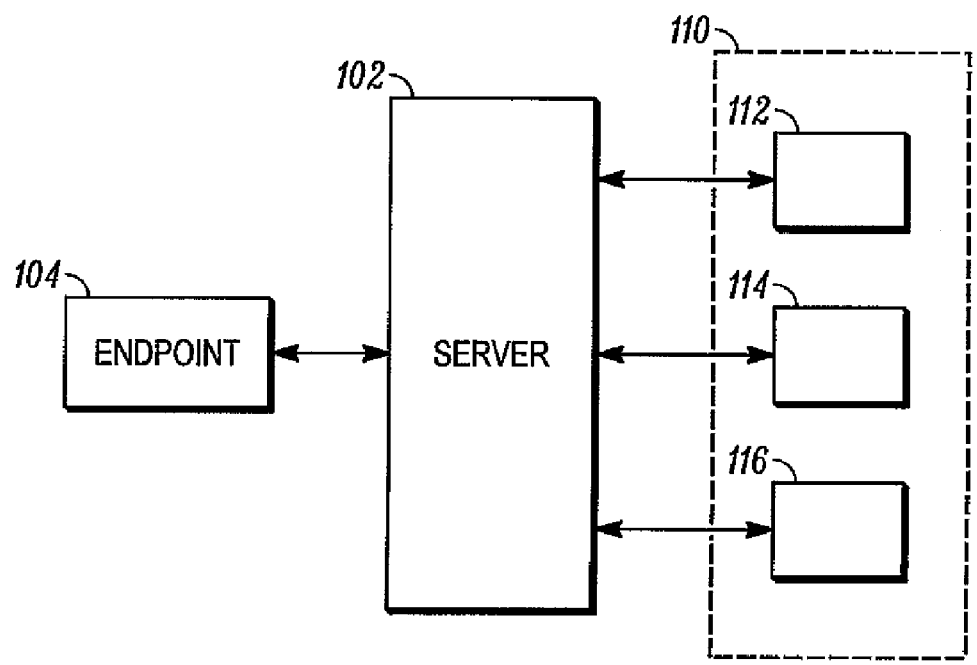
FIG. 1 illustrates a simple block diagram of a prior art call model architecture.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Figure 2:
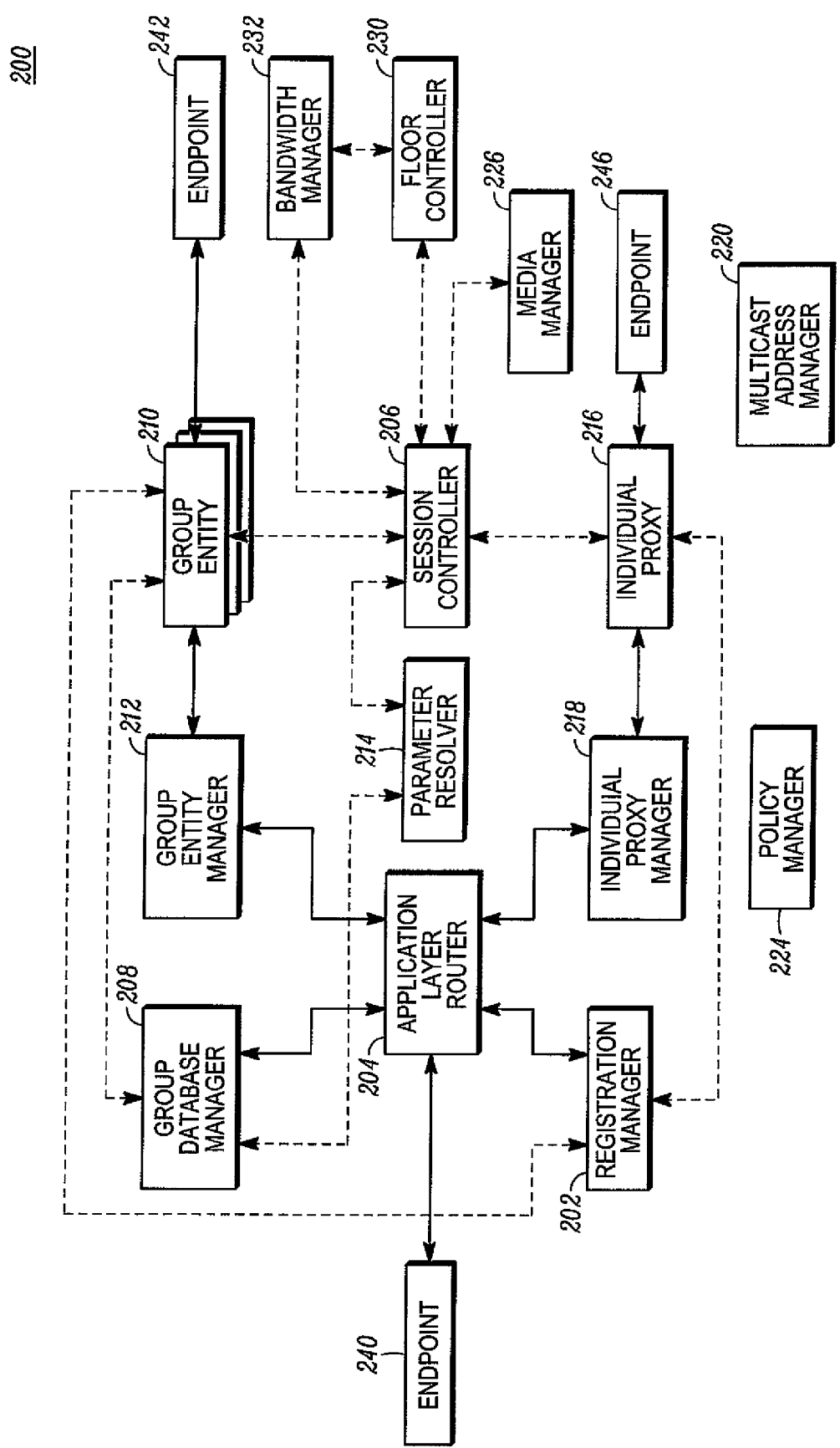
FIG. 2 illustrates a block diagram of a call model architecture in accordance with the present invention.

FIG. 2 illustrates a call control architecture 200 comprising a number of entities and their communication paths for enabling communications between at least two endpoints in a communications system, in accordance with a preferred embodiment of the present invention. Each endpoint typically comprises a logical entity, e.g., a user, and a physical counterpart, e.g., a terminal. Entities connected with solid black lines communicate using a transactional protocol or a broadcast protocol. The preferred transactional protocol is SIP, and the preferred broadcast protocol is SAP. Other entities connected with dashed lines communicate using appropriate protocol known in the art. The architecture 200 is ideal for time critical communications systems such as public safety dispatch systems.

For enabling group communications between at least two endpoints (e.g., endpoints 240 and 242) architecture 200 comprises a session controller 206, a group database manager 208, and at least one group entity 210 that is named and addressable at the application layer. To further facilitate application layer routing, architecture 200 preferably comprises a registration manager 202 and an application layer router 204 that is preferably a SIP proxy. Architecture 200 finally preferably includes a group entity manager 212, a parameter resolver 214, at least one individual proxy 216, an individual proxy manager 218, a multicast address manager 220, a policy manager 224, a floor controller 230, a media manager 226, and a bandwidth manager 232. Architecture 200 is simplified for purposes of illustrating the present invention. However, those of ordinary skill in the art will realize that architecture 200 may include a plurality of each illustrated entity as a function of the size of the system.

Architecture 200 is configured to be independent of an underlying network and air interface and relies on entities such as the bandwidth manager 232 for network specific functionality.

Figure 3:
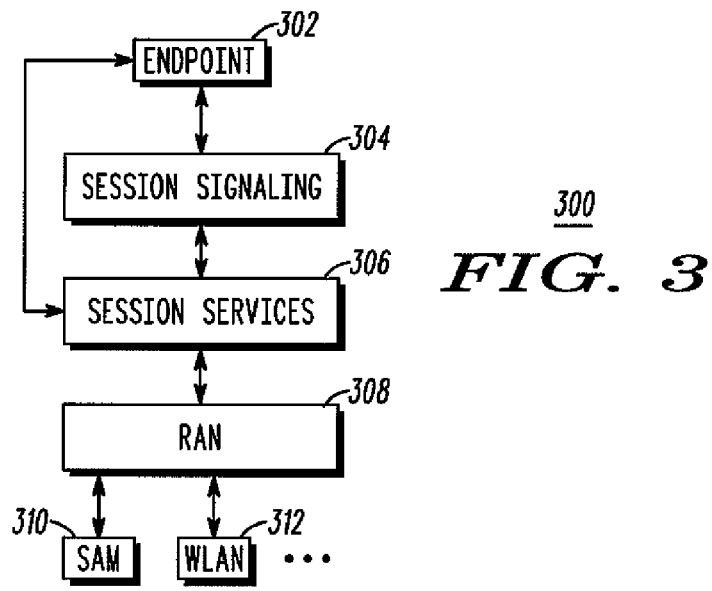
FIG. 3 illustrates a layered view of the call model architecture in accordance with the present invention illustrated in FIG. 2.

Architecture 200 can be viewed as being abstracted into three layers as shown in FIG. 3: a session signaling layer 304; a session services layer 306; and a Radio Access Network (RAN) layer 308. The session signaling layer 304 terminates session control signaling such as SIP, SAP, and SDP that may be used in combination to initiate, modify, and terminate sessions. The session signaling layer 304 further makes requests into and receives events, e.g., lack of bandwidth, from the session services layer 306. The session services layer 306 provides session services such as session interaction for prioritization and preemption and for features such as critical users. The session services layer 306 further enforces system policies such as allowing a user or a group to make a certain call type or to use a certain amount of bandwidth, and also provides in-session services such as floor control or media management services (e.g. transcoding) directly to an endpoint, e.g., endpoint 302. The RAN layer 308 is aware of an underlying wireline and wireless network implementations, e.g., a SAM (Scalable Adaptive Modulation) 310 and a Wireless Local Area Network (WLAN) 312, and provides network specific functionality to support the session services layer 306. This functionality includes bandwidth management for the various wired and wireless links and location management of the terminals in the system.

The layered view 300 is beneficial in that each of the layers can be modified independently of the other layers. For instance, the session signaling layer 304 could be changed without affecting the other layers, if use of a different call control protocol is desired. Moreover, such a layered approach enables architecture 200 to support various air interfaces and mobility schemes without affecting the session services or session signaling.

Figure 4:
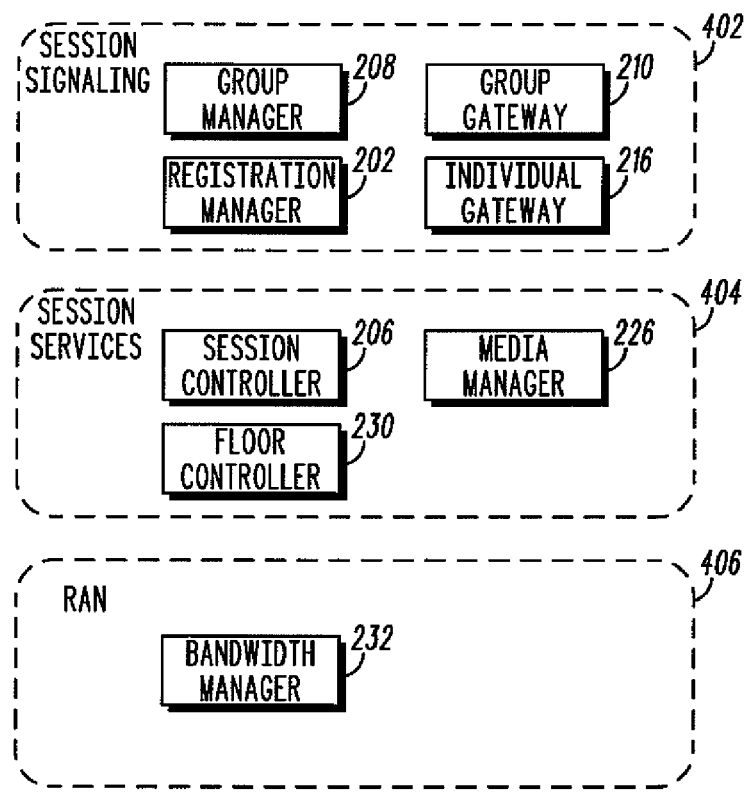
FIG. 4 illustrates a layered view of the call model architecture in accordance with the present invention illustrated in FIG. 2.

FIG. 4 illustrates a layered view 400 of architecture 200 as well as the allocation of the components of the architecture 200 to the various layers. The registration manager 202, group database manager 208, group entity 210, and individual proxy 216 are allocated to the session signaling layer 402. The session controller 206, media manager 226 and floor controller 230 are allocated to the session services layer 404, and the bandwidth manager 232 is allocated to the RAN layer 406. As will be explained in more detail below, the interfaces between the session controller 206 and the individual proxy 216, group entity 210, and bandwidth manager 232 provides flexibility to accommodate systems that use different RANs or different session signaling protocols. Moreover, this layered approach maintains the standard SIP transactional model from the point of view of the endpoints, thereby, simplifying inter-working with both dispatch and non-dispatch endpoints and enabling better leveraging of future SIP standards and products.

Architecture 200 preferably supports two types of session setup methods, confirmed and unconfirmed. In an unconfirmed session setup, session notifications to the endpoints are not acknowledged, which provides better scaling for large groups. All unconfirmed session setups are, thus, preferably automatically accepted by a target terminal without human intervention and without providing the target users an opportunity to decline the session or to indicate which terminal they would like to use. Unconfirmed session setup may be used, for instance, for mission critical group dispatch sessions since these sessions typically need to be active within several hundred milliseconds, and session notifications could then broadcast out to the group.

Confirmed session setup is used when a response is expected or required from every target user or terminal. This type of session setup may be used, for instance, when a session initiator wants to ensure: that the target endpoints are really in the session; that a session only goes to the terminals where a user is present; or that the target endpoints are ready to receive media. It should be noted that session setup could also be a combination of confirmed and unconfirmed, wherein a majority of session invitations are ideally unconfirmed, and only a few strategic or required users receive confirmed session invitations.

The preferred embodiment of each of the entities illustrated in FIG. 2 is described below, including its preferred functionality. Each entity preferably comprises a receiver for receiving information in the communications system, a transmitter for transmitting information in the communications network, and a processor for enabling the entity to perform various functions.

Each endpoint in the system, e.g., endpoints 240, 242 and 246, comprise a unique user and terminal binding, wherein each terminal is preferably a dispatch terminal having the minimum capabilities of PTT functionality to enable communication with the floor controller 230, being able to affiliate itself with a group, and being able to exchange media and control (SAP) via IP multicast. By contrast, non-dispatch terminals are unable to perform one or more of the above three functions. The endpoints preferably comprise both a SIP User Agent Client (UAC) and a SIP User Agent Server (UAS) to enable the endpoint to interact with the communications system to setup, modify, and take down either group directed or individual directed sessions, wherein a group directed session is an invitation to a group, and an individual directed session in an invitation to at least one individual endpoint, e.g., point-to-point. In order to place or receive calls, an endpoint must first register with the system. Since SIP signaling is preferably utilized for all session control signaling, a SIP REGISTER method can be used, wherein all SIP REGISTER requests are preferably forwarded to the registration manager 202. If the endpoint desires to be member of a group, it must affiliate with that group using an AFFILIATE method, according to the present invention, wherein all affiliation requests are preferably forwarded to the group database manager 208.

Endpoints are also preferably configured for receiving SAP announcements to inform the endpoint of the addition and removal of sessions within the context of a group, and during a session, endpoints preferably interact directly with the floor controller 230 for the purpose of controlling the source for a particular session's media streams. The protocol used for floor control interaction is specified in the SDP as part of the SIP and SAP session signaling.

Turning to the session controller 206, it maintains the state for all sessions within its domain of control, e.g., there may be multiple session controllers in a multi-zone system, as a function of factors such as system resources, such as wireless and wireline bandwidth, endpoint resources, e.g., whether an endpoint is currently participating in another session, and capabilities of target endpoints. The session controller 206 is responsible for determining whether or not a requested multimedia session can be established, and works with the bandwidth manager 232 to reserve bandwidth and make the appropriate quality of service (QoS) reservations for a given session. The session controller 206 also works with the parameter resolver 214 to determine a corresponding set of session parameters usable during an accepted session.

The session controller 206 is preferably the one entity in the system with visibility into all sessions and the participants for all of the sessions. Therefore, it preferably uses information such as the critical users to determine whether they are available. Thus, if the critical users are not available, a session will be queued. In addition, session controller 206 may decide to pull a critical user out of a low priority session to place this user in another higher priority session. Furthermore, the session controller 206 preferably knows, either from the group database manager 208 or the registration manager 202, how many simultaneous sessions an endpoint can support and therefore whether it can join the session being setup.

Turning to the group entity 210, it is preferably a specialized SIP entity that combines a SIP UAC, a SIP UAS, and optionally a SAP session directory into a single entity. ITS SIP UAC and SIP UAS functionality enables a single point of control for group communications, and the SAP directory functionality enables increased scalability and performance.

Each group entity is also named and addressable at the application layer to enable endpoints to send SIP signaling to setup sessions with a group to the group's associated group entity. This feature distinguishes the present invention from the prior art server model discussed with respect to FIG. 1, wherein the server responsible for group communications is communicated with at the network layer.

Upon receiving a session request, the group entity 210 is preferably configured for determining the set of endpoints to pull into a session based on group affiliation information from the group database manager 208, and then for passing any requested session parameters and the capabilities for the group members to the session controller 206 with a request that a session be setup. If the session controller 206 grants the request, the group entity 210 signals the session setup to the affiliated endpoints either through a SIP INVITE message for confirmed session setup or via a session announcement protocol, such as multicast SAP announcements, for unconfirmed session setup.

Turning to the individual proxy 216, it is preferably a "stateful" SIP proxy that represents the signaling point of control through which the underlying session controller 206 can be accessed when an individual directed session (e.g. point-to-point) is setup between at least two endpoints. Each individual proxy 216 is instantiated by the individual proxy manager 218 on behalf of the requested session and has a life cycle equal to the session. The individual proxy 216 must insert itself into the SIP route set of an individual directed session to insure that all session control signaling passes through the individual proxy 216 for possible handling by the underlying session controller 206. To the rest of the system and, most importantly, to the endpoints, the SIP signaling looks like it is being sent end to end even though the individual proxy 216 may change the SDP or indicate that a session cannot proceed. This allows adherence to the SIP standard and possibly, better compatibility with standard SIP devices.

In operation, the individual proxy 216 intercepts a SIP INVITE message from an initiating endpoint's UAC and then preferably decides what endpoints to involve in the session based on the destination specified in the INVITE and system policy information. Different policies may specify that a user is called at all of their terminals, called at their mobile terminals, or called at only the terminal specified in the SIP session setup request. Once the list of the endpoints has been selected, the individual proxy 216 preferably determines a prioritized list of capability usable for the session. This information along with the list of requested session participants is sent to the session controller 206. If the session is granted, the individual proxy 216 sends the SIP session INVITE messages to all of the intended endpoints, and the session is setup. Moreover, the individual proxy 216 fills in the SIP FROM header with the address of the session initiator and not its own address so that it is invisible to the endpoints in the session.

As mentioned above, all individual directed session requests are intercepted by the individual proxy 216, which interacts with the session controller 206 to determine if the session should be established or denied as a function of factors that include the availability of system resources required to handle the session's traffic, endpoint resources and capabilities, or other parameters such as authentication, authorization, and access policies. The individual proxy 216 passes information on the requested session, as described by the payload of the SIP request, to the session controller 206. This information is usually in the form of a SDP packet. Through this interaction with the session controller 206, the individual proxy 216 routes the request to the intended recipient endpoint and returns the appropriate response to the session initiator. The interaction between the individual proxy 216 and the session controller 206 can occur through any of a number of conventional mechanisms such as IPC (Inter Process Communications) messaging, RPC messaging, CORBA, RMI, or proprietary inter-process communication means.

If the underlying session controller 206 informs the individual proxy 216 that the session may proceed, i.e., the necessary system resources are available to handle the requested session, the individual proxy 216 preferably functions identically to a normal SIP routing proxy except that it may re-write the SDP to enforce the session controller 206 determination of the updated session parameters (based on available bandwidth, policies, etc.). These updated parameters are returned to the initiating endpoint and the target endpoint using the normal SIP transactions, so that neither endpoint is aware that a third party has taken control of the session negotiation. If resources are not currently available for the requested session or the session controller 206 has determined that one of the endpoints is currently in another session which cannot be interrupted, the session controller 206 can instruct the individual proxy 216 to respond to the initiating endpoint with the appropriate SIP response to deny or queue the session request.

The session controller 206 can preferably also instruct the individual proxy 216 to terminate the session between the endpoints at any time, independent of any requests from either endpoint if network conditions change during a connection or if either party needs to be pulled into anther session. Individual proxy 216 would then send corresponding SIP BYE requests to each endpoint that would be formatted to appear to be part of the control dialog established between the endpoints.

To perform the above functions, the individual proxy 216 must either be in the session initiator's initial route set, or through standard SIP routing conventions, the proxy must add itself to the dialog's route set through, for instance, the appropriate use of SIP's RECORD-ROUTE header. This insures that any future SIP requests from either endpoint will be routed through the individual proxy 216 by use of the complementary SIP ROUTE header. Through this standard mechanism, all future SIP requests that might possibly effect the allocation of network resources will pass through the individual proxy 216 to be examined by the underlying session controller 216.

Turning to the parameter resolver 214, it is configured for establishing at least one set of communication capabilities that are common to the affiliated endpoints of a given group. These capabilities may include audio codecs, video codecs, screen size, full duplex, support for multicast, etc. One a set of group capabilities for a given group is resolved, it is preferably saved in a database for future use in determining the corresponding session parameters for a session involving that given group.

Figure 5:
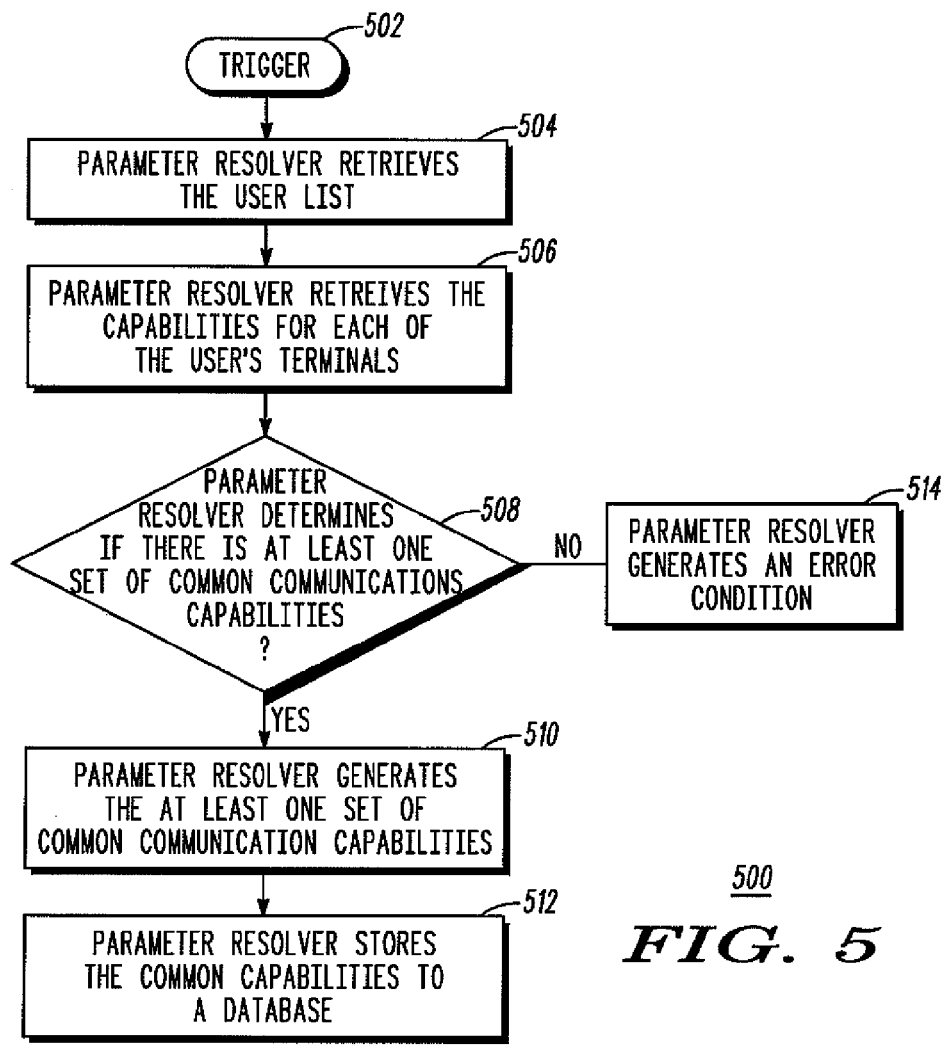
FIG. 5 illustrates a method according to the present invention for generating a set of common communications capabilities for a group.
Figure 6:
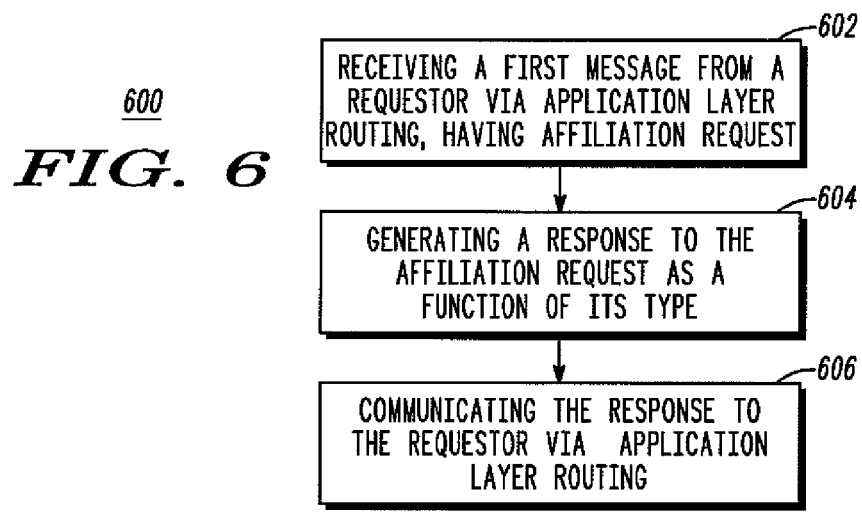
FIG. 6 illustrates a method according to the present invention for affiliating an endpoint with a group.

FIG. 5 illustrates a method 500 according to the present invention for the parameter resolver 214 to generate a set of common communications capabilities for a particular group. The process may be triggered at step 502 by a number of events, including an endpoint registration, an affiliation request, an explicit request to perform the process, or other means. At step 504, the parameter resolver 214 retrieves the user list for the group preferably from an appropriate database, and at step 506 the parameter resolver 214 retrieves the capabilities for each of the users' terminals, also preferably from an appropriate database. At step 508, the parameter resolver 214 then determines if there is at least one set of communication capabilities that are common to at least a subset of the users' terminals. If the determination is yes, then the parameter resolver 214 generates that common set at step 510 and then preferably saves this common set, at step 512, to an appropriate database for future use, for instance, by the session controller 206 or group database manager (208), to determine a corresponding set of session parameters for an accepted session between the group members. If the determination at step 508 is no, then the parameter resolver 214 preferably generates an error condition at step 514. One possible resolution for error conditions is to remove non-critical users from the group so that a common set of session parameters can be formed.

The parameter resolver 214 may perform the steps of method 500 for required media or for optional media. In addition, the parameter resolver 214 may perform step 508, of determining whether at least one common set of capabilities may be generated, as a function of transcoding or a software download. If transcoding is viable, the common capabilities and transcoding parameters are preferably saved to a database. Alternatively, if software downloads are viable, the common capabilities are preferably saved to a database and the appropriate software is either downloaded immediately or flagged for downloading at call setup time.

If a set of common capabilities can be resolved across the entire group by any of the above available means, these parameters are stored in the database. Otherwise method 500 is performed in an attempt to generate a set (or sets) of common capabilities for one or more subsets of group members. Thereafter, when session parameters are requested, for example at call setup time, a process picks the "best" set of parameters from the possible sets in the database based for instance on user request, system policies, call type, availability of bandwidth, context (e.g. emergency), etc. Once the common capabilities database is established, the common parameters can be distributed by the call processing function at call setup time, to reduce the amount of inter-process signaling, or by the affiliation function at affiliation time. Moreover, these parameters can be represented by explicit descriptions (e.g. audio=IMBE, bitrate=4.4 kbps) or by predefined logical sets (e.g. A=low rate audio only, B=high rate audio only, C=low rate audio+low rate video).

Following is a bounce chart that illustrates a specific system implementation in accordance with the present invention wherein the parameter resolver 214 performs method 500. The implementation includes seven functional steps listed below that are performed by entities in architecture 200 (FIG.

2), including three users that are registered at Endpoint 1, Endpoint 2, and Endpoint 3, and become affiliated with a group 1, the Registration Manager (202), the Group (database) Manager (208) and the Parameter Resolver (214).

4. When Endpoint 1 re-registers with new capabilities, only capabilities D are now common across the group members.
5. Endpoint 1 initiates a call by sending a SIP INVITE message to group 1.

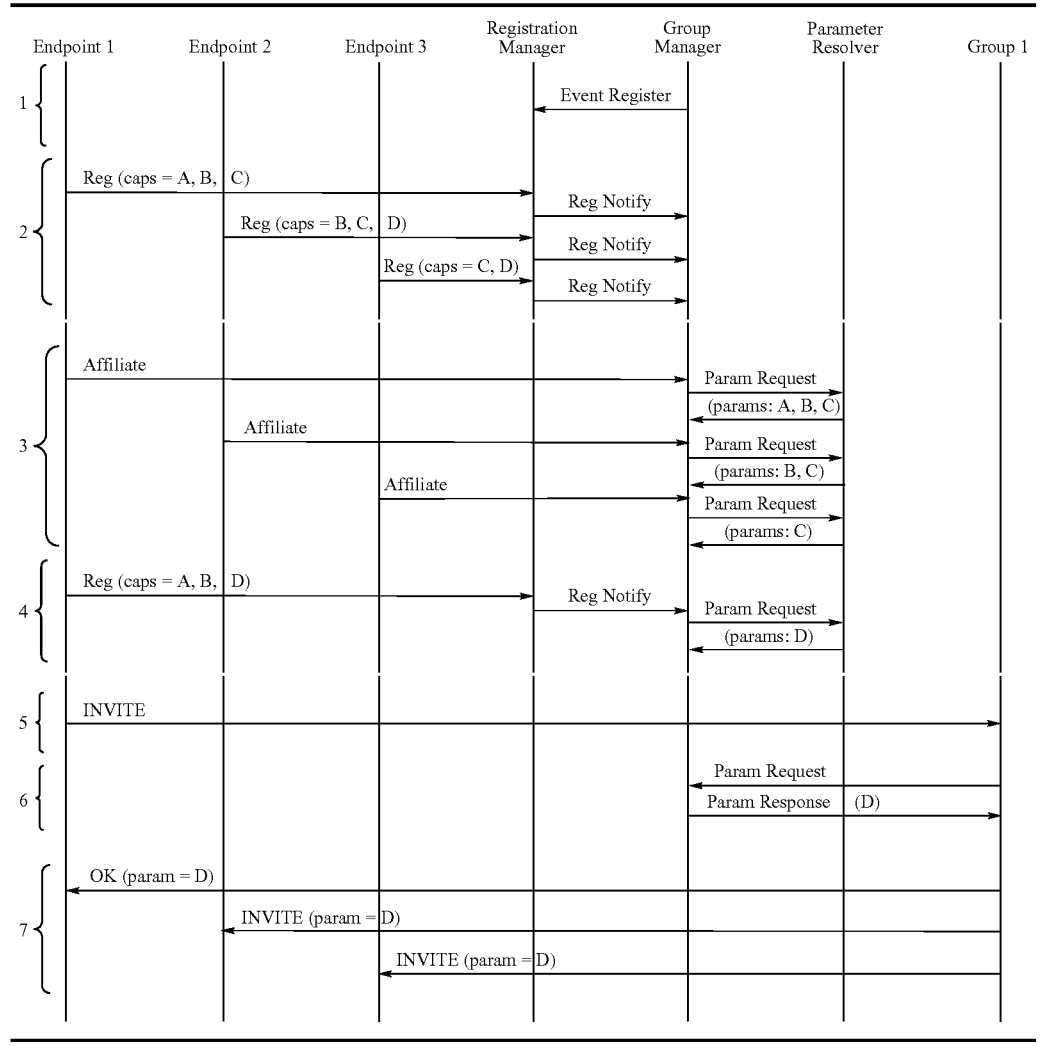

Steps 1-7 of this implementation are as follows:
1. At power up, the Group Manager, which tracks and manages group affiliations, registers with the Registration Manager to receive notifications of all endpoint registrations.
2. As they power up, the Endpoints register their capabilities (e.g., codec, screen resolution, etc.) with the Registration Manger, which in turn notifies the Group Manager of the presence of each new Endpoint and its capabilities. Since these Endpoints are not yet affiliated to any groups, there are no parameters to resolve at this point.
3. As each Endpoint affiliates with group 1, this triggers a request for a recalculation of the common group parameters, in accordance with method 500 (FIG. 5), in anticipation of a group call. When Endpoint 1 affiliates, it is the only group member and so all of its capabilities (A, B, C) are common for the group. When Endpoint 2 affiliates, only capabilities B and C are common across the group members. When Endpoint 3 affiliates, only capabilities C are common across the group members.

6. The Group 1 requests the current common call parameters from the Group Manager (which are D in this example).
7. The call parameters are then distributed to the various Endpoints as part of the call setup signaling.

Turning to the registration manager 202, it is preferably a modified SIP registry and represents a repository containing information on a user and terminal endpoint and the bindings between them. The registration manager 202 is preferably configured for registering both dispatch devices and non-dispatch devices. Registration manager 202 is preferably configured to perform the standard SIP registry functions, including handling SIP REGISTER requests to register endpoints (a user/terminal binding) on the system. It may also be queried by SIP proxy 204 to determine the possible destinations to which a SIP request is to be routed. For example SIP proxy 204 could supply a user name, and the registration manager 202 would preferably respond with a list of terminal addresses where that user is registered.

In addition to performing the above standard SIP registry functions, the registration manager 202 is also preferably configured to maintain information describing the media capabilities of each terminal endpoint and, optionally, a user profile. These terminal capabilities may, for instance, be sent in as an extension to the standard REGISTER requests to and will describe the attributes of the terminal such as screen size, input/output capabilities, available codecs, etc. The registration manager 202 is also preferably configured to notify the group database manager 208 of each successful registration or re-registration request that it processes.

Turning to the group database manager 208, it represents a repository containing information on the various group contexts (i.e. group voice, video, and data) that have been provisioned within the system. The group database manager 208 tracks group member affiliation for each group in the system and preferably processes AFFILIATE requests from the endpoints to affiliate themselves with one or more groups, so that when one member of the group transmits, all members may receive the media. The group database manager 208 will either allow or disallow the affiliation, based on factors such as: system provisioning of authorization for a particular user to join a particular group; and whether the user's terminals have communication capabilities that are compatible, i.e., can be resolved, with the communication capabilities with any other endpoint already affiliated with the group. The group database manager 208 is also preferably the keeper of system policies for individual groups, such as their priority, allowable session parameters, session time limits, etc.

Since session parameter resolution is a potentially complex and time-consuming process for a group, preferably the session parameters are be calculated ahead of time. Accordingly, the group database manager 208 will preferably store the valid sets of resolved session parameters for each group that are calculated by the parameter resolver. As group members affiliate, the group database manager 208 will then update the stored set (or sets) of valid session parameters for the group. Moreover, multiple sets of session parameters may be stored for different categories of usage scenarios. For example, there may be a set specifically for high quality video, or a set for audio only.

FIG. 5 illustrates a method 600 according to the present invention having steps to be performed by the group database manager 208 to affiliate an endpoint with a particular group. Method 600 includes the steps of: step 602 receiving a first message from a requester (e.g., an endpoint or a group entity on behalf of a non-dispatch terminal) via application layer routing, preferably SIP, that includes an affiliation request in accordance with the present invention; step 604 generating a response to the affiliation request as a function of the type of affiliation request received; and step 606 communicating the response to the affiliation request to the requester via application layer routing.

The AFFILIATE request is transmitted from a SIP UAC, and it may contain: 1) a list of one or more user groups it wishes to affiliate with through the use of an Associate extension header in accordance with the present invention; 2) a list of one or more Contact headers to be affiliated with a given group, or 3) a query for a list of groups it is allowed to affiliate with. Upon receiving the AFFILIATE request, the group database manager 208 is preferably configured to verify and interpret the request, and to generate one of a number of possible SIP responses, e.g., Success, Partial Success, Deny, and Error.

More specifically, if the request specified at least one group via an Associate header and at least one Contact header, the response includes the groups to which the each Contact address in the request is currently affiliated, together with the multicast addresses on which each group's session announcements will be made, if applicable. If the request contains no Associate header, but contains at least one Contact header, the response includes a list of groups to which each specified Contact address is affiliated. If the request contains at least one Associate header but no Contact header, the response includes a list of all Contact addresses for the given user (as identified by the To header) currently affiliated with the identified group. Moreover, if the request contains neither Associate nor Contact header information, the response includes a list of all groups to which the user is affiliated (e.g., as identified by the request's To header) on any of the identified endpoints (e.g. any Contact address).

The following preferred extensions to SIP may be used for enabling the above-described affiliation functionality.

An AFFILIATE REQUEST message is generated by a SIP UAC to associate a user to a group. The AFFILIATE REQUEST message must contain information allowing a user to be bound to a group name. A preferred format for the AFFILIATE
REQUEST message is shown below. It follows the general SIP header format for Request messages (i.e. it includes the headers Via, From, To, Call-ID, Cseq, Expires), but also includes the AFFILIATE header and the Associate header, in accordance with the present invention.

```
AFFILIATE <request URI> <sip ver>
Via: <sip ver><transport> <host name>
From:<Address of record of requester>
To: <Address of record of individual user being affiliated>
Contact: <Endpoint address being affiliated>
Call-ID: <Identical ID for all affiliations from an
endpoint>
Cseq: <AFFILIATE>
Associate: <list of groups affiliating with. the affiliation
server will bind the 'Contact' and 'Associate' fields >
Expires:<Global lifetime of affiliation is seconds>
```

In the following example, the AFFILIATE request is seen as it would appear in a
hypothetical system where a user is being affiliated with multiple groups. In this example, the Address of Record (AoR) indicates the user "m.korus" is affiliating his contact endpoint address of "korus@ht2137.mot.com" with the groups "casper_team" and
"tech_team". Upon a successful affiliation, the user can participate in sessions to these groups at the affiliated contact endpoint. The request preferably has the following format:

```
AFFILIATE sip:motorola.com SIP/2.0
Via: SIP/2.0/UDP ht2137.mot.com
From: M. Korus <m.korus@motorola.com>
To: M. Korus <m.korus@motorola.com>
Contact: <sip:korus@ht2137.mot.com>
Call-ID: 3910329203@ht2137.mot.com
Cseq: 217 AFFILIATE
Associate:
tech_team@mot.com;expires=3700,casper_team@mot.com
Expires: 7200
```

A user could also query the affiliation server (i.e. group database manager 208) by sending an AFFILIATION request with the desired combination of Associate or Contact headers, but not both. For example, to obtain a list of all Contact addresses for a given user affiliated with a given group. The request preferably has the following format

```
AFFILIATE sip:motorola.com SIP/2.0
Via: SIP/2.0/UDP ht2137.mot.com
From: M. Korus <m.korus@motorola.com>
To: M. Korus <m.korus@motorola.com>
Call-ID: 3910329203@ht2137.mot.com
Cseq: 217 AFFILIATE
Associate: tech_team@mot.com
Content-Length: 0
```

Moreover, the a request having the following preferred format would cause a response to be generated that includes a list of all affiliated groups for the specified user:

```
AFFILIATE sip:motorola.com SIP/2.0
Via: SIP/2.0/UDP ht2137.mot.com
From: M. Korus <m.korus@motorola.com>
To: M. Korus <m.korus@motorola.com>
Call-ID: 3910329203@ht2137.mot.com
Cseq: 217 AFFILIATE
Content-Length: 0
```

A SIP RESPONSE message is required to complete the AFFILIATE REQUEST Transaction, which is similar to the SIP RESPONSE for a SIP REGISTER message. The contents of the AFFILIATE response may contain an Accept/Deny for each group that the user requests to affiliate with, and an assigned multicast address (for control) for each group or a list of unicast or multicast addresses (for media). A preferred format of an AFFILIATE response is:

```
_SIP/2.0 200 SUCCESS
Via: SIP/2.0/UDP ht2137.mot.com
From:<sip:m.korus@motorola.com>
To: <sip:m.korus@motorola.com>
Call-ID: 3910329203@ht2137.mot.com
Cseq: 217 AFFILIATE
_Associate:
sip:tech_team@mot.com;maddr=235.254.254.1;expires=3700,
sip:casper_team@mot.com;maddr=235.255.250.8
Expires: 7200
```

For any group to which affiliation was denied, the expiration time is preferably set to zero, and an alternate response status could be used to indicate to the requester that some of the requested affiliations were denied. Like SIP's REGISTER request and its responses, AFFILIATE request response messages are preferably returned to the requester by following the path specified by the received request's list of Via headers. Contact headers are preferably used only to specify the affiliation bindings within a requests for creating the greatest consistency with SIP's REGISTER request semantics.

Turning to the floor controller 230, it is responsible for managing access to an associated media stream or streams. The floor controller 230 processes requests for the floor from endpoints, and arbitrates to decide which endpoint is allowed to source media on the media channel. The floor controller 230 performs separate arbitration for each media stream, arbitrating based on rules or policies in the system. When the floor controller 230 grants the floor to a particular endpoint, it preferably notifies the bandwidth manager 232 of the change so that, if required, the bandwidth reservation can be shifted to the new endpoint. If the session is controlled by a hang-time for the media, the floor controller 230 will also preferably notify the session controller 206 know of when the hang-time has expired.

Turning to SIP Proxy 204, it a standard SIP proxy for directing control and information messages to a target logical entity as a function of the associations maintained by the registration manager 202.

Turning to the group entity manager 212, it is preferably responsible for creating, maintaining and destroying each group entity 210. It is also preferably configured as a specialized SIP proxy for routing SIP requests to the proper group entity 210. All requests for the establishment of a new session in a group context are routed through the group entity manager 212. The group entity manager 212 will instantiate the group entity 210 for a group when a session is set up if the group entity does not exist. Future session setup signaling for that group will be routed to that group entity 210, preferably by the group entity manager 212.

Turning to the individual proxy manager 218, it is preferably responsible for creating, maintaining and destroying each individual proxy 216. It is also preferably configured as a specialized SIP proxy for routing SIP requests to the proper individual proxy 216. All requests for the establishment of a new session in an individual, e.g., point-to-point context are routed through the individual proxy manager 218. The individual proxy manager 218 will instantiate an individual proxy 216 for an endpoint when a session is setup.

Turning to the multicast address manager 220, it manages a pool of multicast addresses, allocating them on both a semi-permanent and temporary basis. The multicast address manager 220 preferably has the capability to monitor the type and length of use of allocated addresses in order to determine how, when, and for how long they are used. This enables the manager 220 to reclaim addresses that have not been in use for some time and to prioritize reclamation of addresses that are in use if the pool becomes empty.

Accordingly, the multicast address manager is configured for performing the following functions: 1) supplying a multicast address from the pool, either temporarily or semi-permanently when requested by an external process; 2) replacing addresses into the pool when returned by an external processes; 3) taking stats on when addresses are used and for what purpose; 4) reclaiming semi-permanent addresses that have been allocated but have been unused beyond some threshold time in order to keep the pool full and minimize router state; 5) in the event that the pool becomes empty, reclaiming addresses that are not being used and have not timed out; 6) in the event that the pool becomes empty, reclaiming addresses that are being actively used based on the priority of the stream, the type of stream, the usage history of the stream, etc.; and 7) consolidating media and control streams that utilize multiple multicast addresses onto a single address. Functions 4-7 may optionally require permission from the system.

Figure 7:
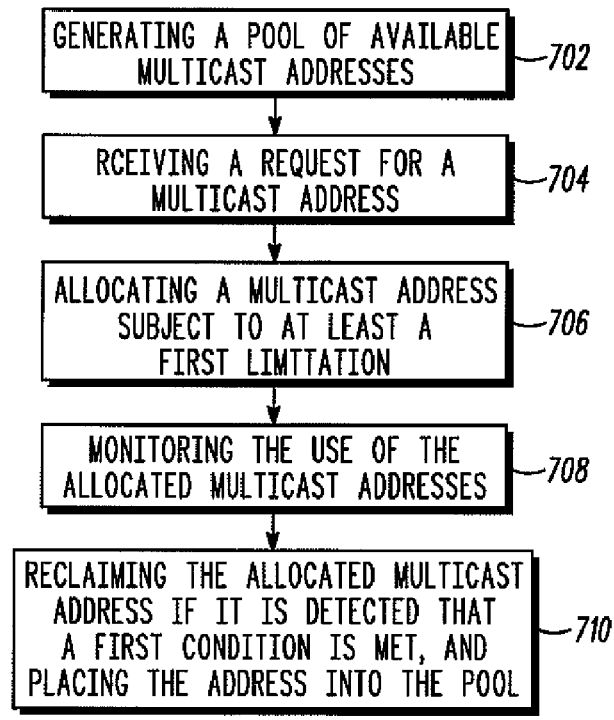
FIG. 7 illustrates a method according to the present invention for managing a pool of multicast addresses.

FIG. 7 illustrates a method 700 according to the present invention for the multicast address manager 220 to manage a pool of available multicast addresses. Method 700 comprises the steps of: step 702 of generating a pool of available multicast addresses; step 704 of receiving a request for a multicast address; step 706 of allocating a multicast address for usage subject to at least a first limitation; step 708 of monitoring the usage of the allocated multicast address; and step 710 of reclaiming the allocated multicast address if as a function of the monitoring it is detected that a first condition is met, and causing the allocated multicast address to be placed onto the pool of available multicast address.

Following is a bounce chart that illustrates a specific system implementation in accordance with the present invention wherein the multicast address manager 220 performs method 700. The implementation includes six functional steps listed below that are performed by entities in architecture 200 (FIG. 2), including a SIP Endpoint, the Group (database) Manager (208), a Group (entity) Gateway (210), the Session Controller (206), and the (multicast) Address Manager (220).

that "multicast address 1" and "multicast address 2" should be used for the session. The Endpoint, begins sourcing the first media (e.g. voice) on the already joined "multicast address 1". Simultaneously, the Endpoint joins "multicast

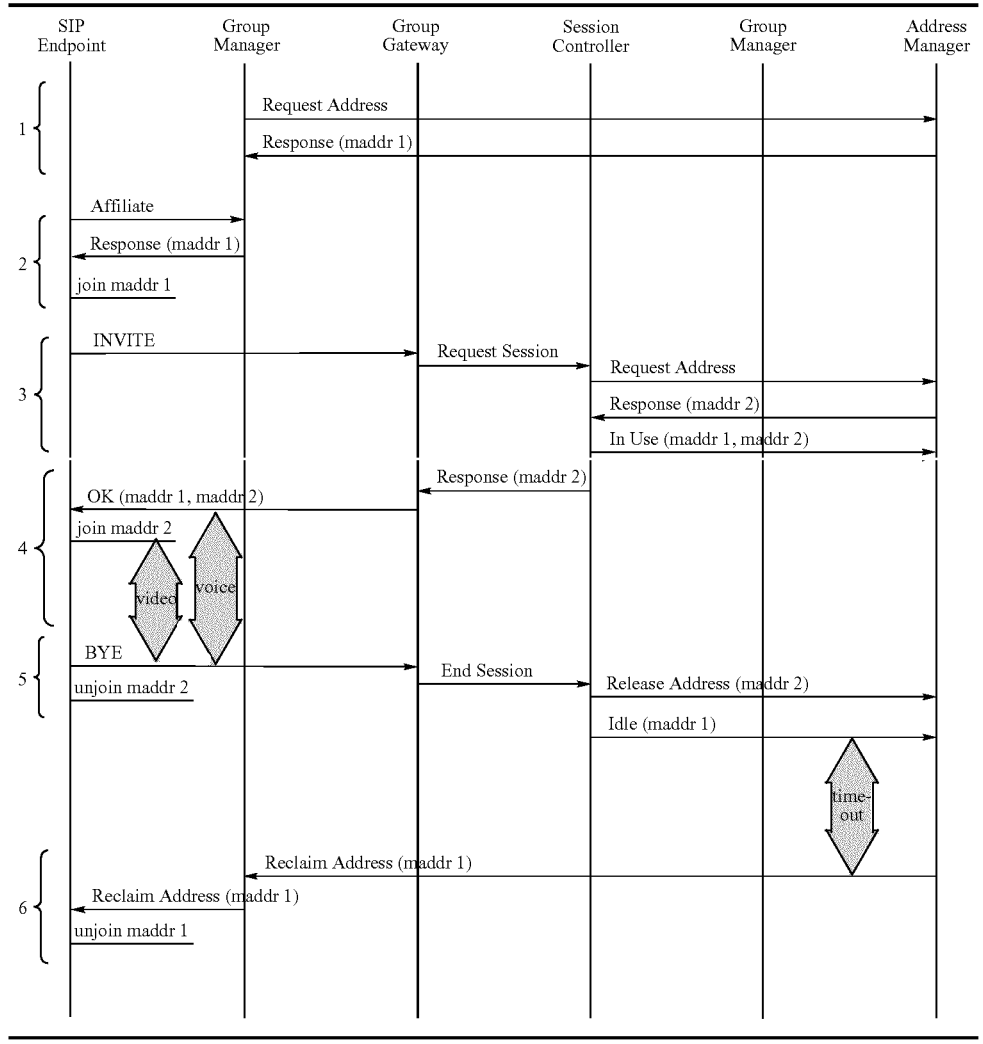

Steps 1-6 of this implementation are as follows:

1. At group creation time, the Group Manager requests a multicast address for a semi-permanent allocation. The Address Manager returns "multicast address 1".
2. An Endpoint affiliates to the group. The response informs the Endpoint of "multicast address 1", which the Endpoint joins.
3. The Endpoint initiates a session for two media streams (e.g. voice and video) by sending an INVITE to the Group Gateway. The Group Gateway asks the Session Controller permission for the session and requests resources. The Session Controller, realizing that only one of the media streams has a multicast address allocated, requests an additional address from the Address Manager, which allocates "multicast address 2". The Session Controller then informs the Address Manger that "multicast address 1" and "multicast address 2" are in active use.
4. "Multicast address 2" is returned to the Group Gateway which forms a response back to the originator indicating address 2" and begins sourcing the second media (e.g. video).

5. At the end of the session, the Endpoint sends in a BYE message. This causes the Session Controller to release "multicast address 2" back into the pool (since it was a temporary allocation) and informs the Address Manager that "multicast address 1" is idle once again.
6. If "multicast address 1" is not used for some time period, a timer will expire and the Address Manger will reclaim the allocation, forcing any Endpoints that are part of the tree to unjoin.

In this implementation the Session Controller is shown as the control point for requesting and releasing short-term addresses, but other entities could perform this functionality.

Extensions to the standard SDP semantics are provided in accordance with the present invention to allow media channels to be assigned by the recipient of a SIP session invitation. The following embodiment of the present invention uses these extensions to implement a method allocating at least one address (e.g., a multicast address) for media exchange during a session between endpoints.

Normally an SDP packet identifies the session, media types, channel port numbers, channel IP addresses, and media encodings. For example, the following SDP packet identifies a multicast audio session with an associated media control channel using H332 floor control:

s="session identification"
a type:H332
m=audio 43564 RTP/AVP 31
c=IN IP4 224.2.23.31/1
m=control 3910H332 mc
c=IN IP4 196.192.0.5

The "m=" field of an SDP packet identifies a media type to be used within the session and the port on which the media will be received. The "c=" field of an SDP packet identifies the channel (IP address) to be used for a particular media type. The channel identifier can be applied to all media streams within the SDP packet or to an individual media type. In the later case, a media type identifier would be followed by a corresponding channel identifier.

However, the above packet structure cannot be used in the case where an endpoint requests a new session between multiple parties for sourcing multicast media between all parties to the session. In this case, some form of coordination of multicast channel assignments is required that can be centralized within some process in the system's infrastructure. To address this shortcoming, a standard SDP packet can preferably be restructured in accordance with the present invention, as described below, for such coordination of multicast channels.

The SDP packet of the session initiation request should preferably still identify the types of media that will be carried by the session. Normally a channel identifier that specifies a null address (e.g. c=IN IP4 0.0.0.0) is an indication that the corresponding media stream is to be put on hold. Combining this channel identifier semantic with a corresponding media type identifier specifying a null port identifier provides a means for the session's initiator to signal to a coordinating entity that appropriate addresses need to be assigned. The session's initiator would preferably form the following SDP packet to describe the session to be created:

s="session id"
a type:H332
m=audio 0 RTP/AVP 31
c=IN IP4 0.0.0.0
m=control 0H332 mc
c=IN IP4 0.0.0.0

The session attribute (a=type:H332) signals the recipient that the session being
requested requires H.332 floor control. The media identifiers and channel identifiers
carry null port and address assignments, respectively. This signals to the recipient that
the corresponding multicast media channel and port and unicast (or multicast) control
channel and port are to be assigned. The recipient may then coordinate with the corresponding system level process to determine the address and port assignments to be assigned to this session, and return a modified SDP packet containing the assigned addresses and ports. The initiator will accept the modified SDP packet with the newly assigned media channels.

Alternately, using the extension mechanisms defined in RFC2327, new session level attributes could be defined providing more explicit control of how addresses are assigned to multiparty sessions as well as the type of messaging used (e.g. unicast vs. multicast) on a given media stream. Following is one embodiment of the present invention, wherein an SDP packet is augmented with extension attributes for media address assignment:

s="session id"
a type:H323
a=x_multiparty
m=audio 0 RTP/AVP 31
c=IN IP4 0.0.0.0
a=x_peer2peer
m=control 0 H323 mc
c=IN IP4 0.0.0.0

In this example, the session level attribute (x_multiparty) is used to inform the
media control entity to assign multicast addresses to all unassigned media streams. However, the stream level attribute (x_peer2peer) identifies to the media controller
that a unicast address should be assigned to the floor control entity. Using a variety of
session and stream level attributes would allow any combination of multicast and unicast
streams to be assigned by the system.

Turning, finally, to the policy manager 224. By the nature of the different ways in which customers are likely to use future multimedia systems, a lot of flexibility must be built into the system. By creating a well-defined and easy to manage set of policies that control system behavior, the customer can tailor the system without the need of special software builds. The policy manager is preferably configured to control access to a policy database where the various policies are stored.

Figure 8:
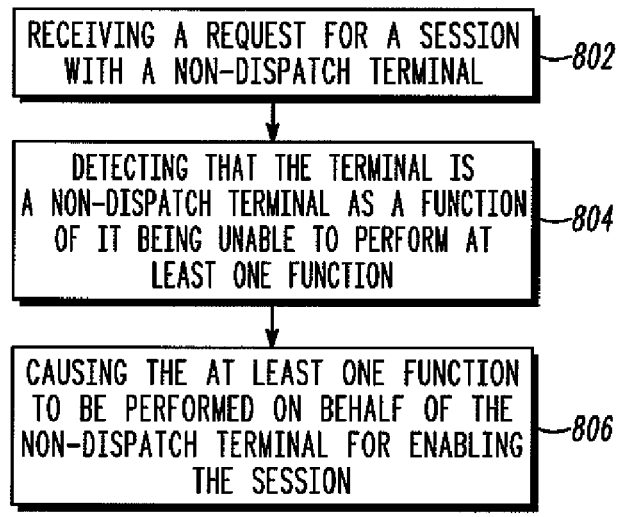
FIG. 8 illustrates a method according to the present invention for enabling communications with an endpoint comprising a non-dispatch terminal.

As stated above, the endpoints in architecture 200 (FIG. 2) are preferably dispatch endpoints. However, when at least one endpoint comprises a non-dispatch terminal, one embodiment of the present invention provides for a method for facilitating a session with the non-dispatch terminal. FIG. 8 is a flow diagram that illustrates a method 800 for facilitating communication with a non-dispatch terminal. Step 802 is receiving a first message having information that includes a request for a session between a first endpoint comprising a non-dispatch terminal and at least one other endpoint. Step 804 is detecting that the first endpoint comprises a non-dispatch terminal as a function of the non-dispatch terminal being unable to perform at least one function. Finally, step 806 is causing the at least one function to be performed on behalf of the first endpoint by at least one service entity for facilitating the session with the non-dispatch endpoint.

Preferably, the group entity 210 receives the first message and detects that a non-dispatch device is attempting to perform a group call. For instance, when a non-dispatch terminal sends an INVITE to the group entity 210, the group entity might detect that it is not dispatch capable by one of the following means: the lack of floor control profile in the INVITE SDP; the lack of proprietary dispatch headers; the lack of a registration and/or affiliation record; or as indicated by capabilities queried by an OPTIONS commend.

Using these means, the group entity might detect that the endpoint is incapable of affiliating with a group. In this case the group entity may automatically affiliate the endpoint. The group entity would then preferably generate signaling targeted specifically to the standard device that directs the standard device's media to the media manger. This signaling may carry session parameters that are different than those distributed to the dispatch enabled endpoints.

The group entity might also detect that the terminal is unable to communicate with the floor controller 230. In this case, the group entity would preferably generate signaling to the non-dispatch endpoint to cause the endpoint to direct its media to the media manager, which would preferably be configured to impose talker arbitrated floor control on a full duplex device, e.g., the non-dispatch endpoint. The media manager will preferably generate floor requests to the floor controller when voice is sourced by the non-dispatch terminal. As an option, tones or other audio information could be sent out to the user if they attempt to speak when someone else has the floor to discourage them from speaking further. Audio information will likely be used for this purpose instead of explicit signaling because blocking a talker is not supported by SIP signaling.

inbound path, however, the standard device should preferably not transmit on the multicast channel since its transmissions may not be disciplined by the floor controller.

Following is a bounce chart that illustrates a specific system implementation in accordance with the present invention for enabling communication with a non-dispatch terminal in accordance with method 800. The implementation includes nine functional steps listed below that are performed by entities in architecture 200 (FIG. 2), including a Standard (i.e., non-dispatch) Terminal, two Dispatch Terminals affiliated with a group, a Group (entity) Gateway (210), a Group (database) Manager (208), a Policy Manager (224); a Media Manager (226) and a Floor Controller (230).

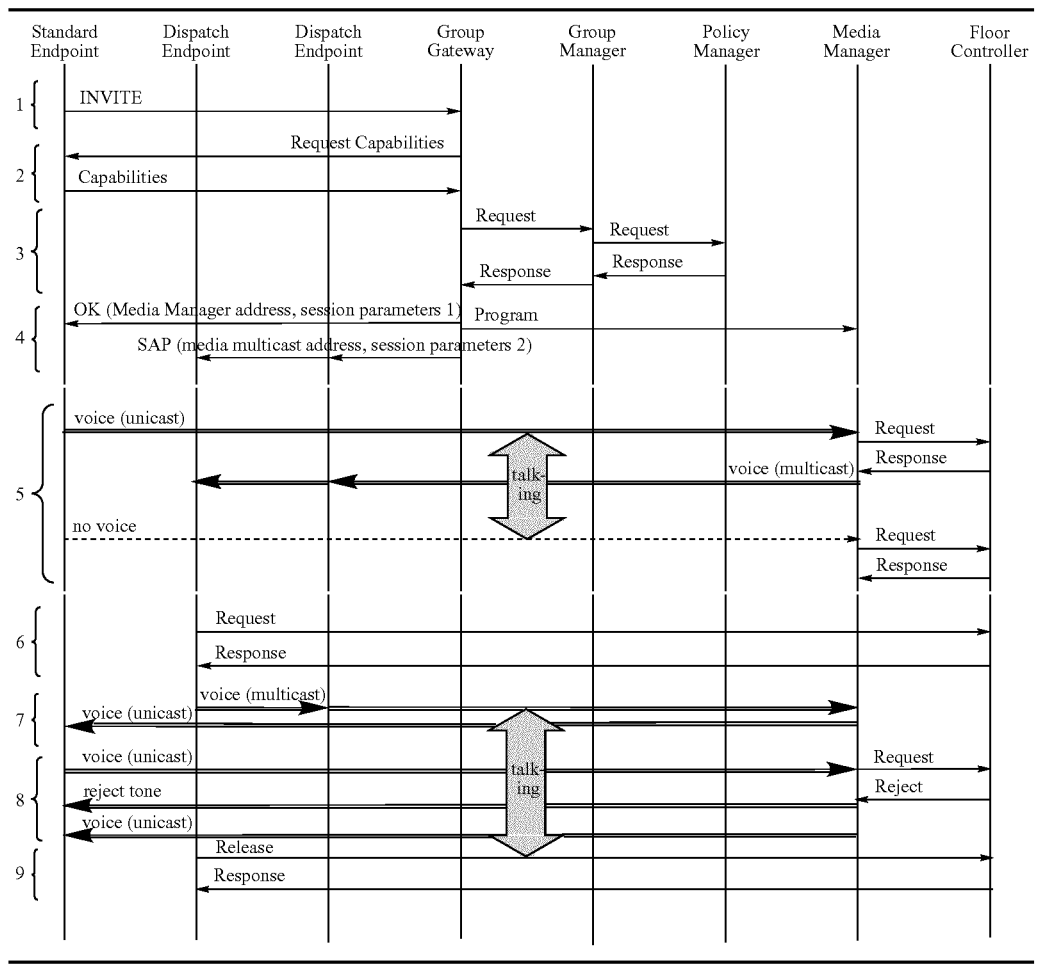

The group entity might also detect that the terminal is unable to exchange media via IP multicast. In this case, the group entity would preferably generate signaling to the non-dispatch endpoint to cause the endpoint to direct its media to the media manager, which would be preferably configured to bridge unicast and multicast media streams. For instance, when the non-dispatch device has the floor, its unicast media will be retransmitted by the media manager onto the common multicast channel used by the dispatch terminals. When a dispatch terminal has the floor, its multicast media will be duplicated and sent to the non-dispatch device using unicast. Moreover, if the non-dispatch device is multicast capable, the device could be directed to listen to the normal multicast traffic instead of generating a separate unicast stream. On the 1. Standard SIP device initiates a group call by addressing a SIP INVITE to the group.
2. Optionally, the Group Gateway could query the device for its capabilities using standard SIP procedures.
3. Optionally, the Group Gateway could authorize the initiator with the Group Manager, which would base its decision, in part, on system policies. In addition, the Group Manager may choose to automatically affiliate this endpoint to the group so that it would be part of any future group calls. If this affiliation is performed, this user may be given more restrictions than provisioned group members.
4. SIP signaling is returned to the initiator with the address of the Media Manager (for its inbound media) as well as session parameters (codec, bitrate, etc.). Group dispatch session parameters are sent to the normal group members using broadcast announcements. In addition, the Media Manager is programmed to convert the beginning of any talk spurts from this user into requests for floor control and convert between unicast and multicast media.

5. The initiator begins speaking, sending their voice packets to the Media Manager. The Media Manager detects the presence of voice and generates a request for the floor. The media is also multicasted out to the normal group members. When the initiator stops speaking, the silence generates a release of the floor.

6. A normal group member requests the floor using explicit floor control signaling.

7. After being granted the floor, this user begins transmitting their voice via multicast. This multicasted media is sent to the standard endpoint via unicast.

8. When the standard endpoint tries to talk over the current talker, their talkspurt again generates a request for the floor, which is rejected. This rejected can be indicated by sending a short burst of tones or other audio data to the endpoint to discourage them from speaking.

9. The current floor holder releases their PTT, relinquishing the floor.

The following is a summary of how communications sessions are preferably setup in accordance with the present invention as illustrated by architecture 200. An endpoint 240 sends a SIP INVITE to the application layer router 204 that forwards it to either the group entity manager 212 or the individual proxy manager 218 based on the sub-domain specified in the destination address in the To header of the INVITE. If the group entity manager 212 receives the INVITE, it will instantiate a new group entity 210 for a group if one does not exist. Future session setup signaling for that group will be routed to that Group entity 210. If the individual proxy manager 218 receives the INVITE, it will instantiate a new individual proxy 216 for the new individual session.

The individual proxy 216 or group entity 210 then communicates with the cession controller 206 to determine if the session can be setup. Upon acceptance of the session, the Session Controller notifies the group entity or the individual of the information that it needs to proceed with the session. In the case of the group entity receiving the information, the group entity generates session signaling to the Endpoints that will be involved in the session. Session signaling can take the form of SIP INVITE messages for confirmed group sessions (or individual sessions), or SAP announcements for unconfirmed group sessions. The source indicated in the From header of the INVITE is the group name for group sessions (and is the session initiator for individual sessions). The group members receive the SAP announcements on a multicast channel that has been setup for that group, and group members learn of and join the multicast channel during group affiliation.

Once a session is in place, the endpoint sends floor control signaling to the floor controller 230 to request the floor. The floor controller 230 will use the rules and policies for that session and stream to determine if it should grant the floor. Finally, the session may be modified and terminated in accordance with the method described in related application Ser. No. 10/334,521, filed Dec. 31, 2002, entitled METHOD AND SYSTEM, FOR GROUP COMMUNICATIONS, filed concurrently herewith.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. In a communications system having at least one service entity and a plurality of endpoints each comprising a logical entity and a terminal, a method for facilitating a session between at least two of the endpoints, comprising:
   receiving, by the at least one service entity, a first message having information that includes a request for a session between a first endpoint comprising a non-dispatch terminal and a group to which at least one other endpoint comprising a dispatch terminal is affiliated;
   detecting, by the at least one service entity, that the first endpoint comprises a non-dispatch terminal as a function of the first endpoint being unable to affiliate with the group; and
   causing the group affiliation to be performed on behalf of the first endpoint by the at least one service entity for facilitating the session between the first endpoint and the at least one other endpoint.

2. The method of claim 1, wherein the communications system includes a group entity and the group entity performs the group affiliation on behalf of the first endpoint.

3. The method of claim 1, wherein:
   the first endpoint is unable to generate a floor control request to the floor controller in order to source media during the session; and
   the floor control request is performed on behalf of the first endpoint for facilitating the session between the first endpoint and the at least one other endpoint.

4. The method of claim 3, further comprising generating signaling, by the at least one service entity, to the first endpoint for causing the first endpoint to direct its media to a first service entity included in the communications system for causing the first service entity to generate the floor control request on behalf of the first endpoint.

5. The method of claim 4, further comprising causing information to be sent to the first endpoint by the first service entity for notifying the first endpoint that it cannot source media because another endpoint has the floor.

6. The method claim 5, wherein the information includes audio information.

7. The method of claim 6, wherein the audio information is a tone.

8. The method of claim 3, wherein the communications system includes a media manager service entity, and the media manager service entity generates floor control requests to the floor controller on behalf of the first endpoint.

9. The method of claim 6, wherein the information is sent to the first endpoint as a function of the first endpoint attempting to source its media during the session.

10. The method of claim 1, wherein:
    the first endpoint is unable to exchange media via Internet Protocol (IP) multi-cast, wherein IP multicast is the protocol used by the dispatch terminal; and
    the media exchange via IP multi-cast is performed on behalf of the first endpoint for facilitating the session between the first endpoint and the at least one other endpoint.

11. The method of claim 10 further comprising generating signaling, by the at least one service entity, to the first endpoint for causing the first endpoint to direct its media to a first service entity included in the communications system for causing the first service entity to perform the media exchange via IP multi-cast on behalf of the first endpoint.

12. The method of claim 10, wherein the first endpoint is configured for exchanging media via IP unicast, the method further comprising:
   receiving unicast media, by the first service entity, from the first endpoint;
   causing the unicast media to be transmitted to the at least one other endpoint in the session via IP multicast by the first service entity; and
   causing, by the first service entity, any multicast media transmitted by the at least one other endpoint in the session to be transmitted to the first endpoint via IP unicast.

13. The method of claim 10, wherein the communications system includes a media manager service entity for causing the media exchange via IP multicast to be performed on behalf of the first endpoint.

* * * * *